Sept. 20, 1938.  A. E. HINTERMEYER  2,130,684
METHOD OF FORMING A CUTTING TOOL
Filed Oct. 30, 1936
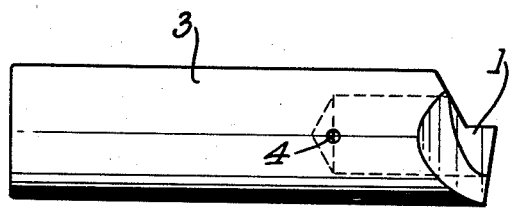
Fig. 1.
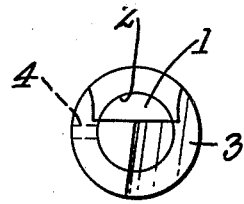
Fig. 2.
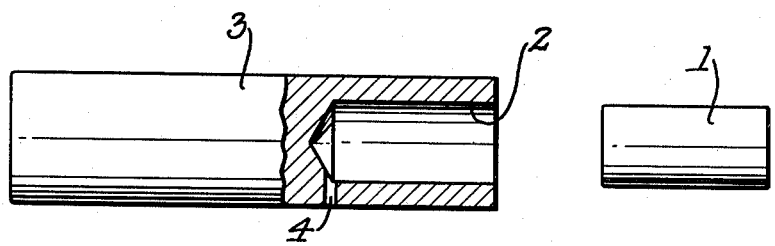
Fig. 3.
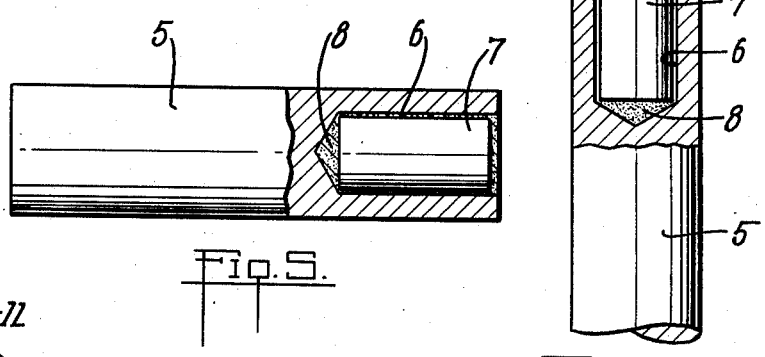
Fig. 5.
Fig. 4.
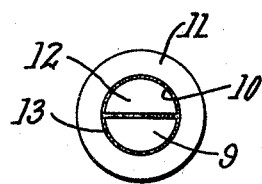
Fig. 6.
Inventor
Alfred E. Hintermeyer
By Geo. H. Kennedy Jr.
Attorney Patented Sept. 20, 1938

2,130,684

UNITED STATES PATENT OFFICE 2,130,684

METHOD OF FORMING A CUTTING TOOL

Alfred E. Hintermeyer, Worcester, Mass., assignor to The Heald Machine Company, Worcester, Mass., a corporation of Massachusetts Application October 30, 1936, Serial No. 108,416

1 Claim. (Cl. 76—101)

The present invention relates to cutting tools and particularly to a method of forming cutting tools for boring or turning, consisting of a tool bit of cemented tungsten carbide, or other hard material, mounted in a holder.

Tools of this character, if made entirely of the cemented tungsten carbide, would be extremely expensive, and in order to reduce the cost of these tools a relatively small tool bit of tungsten carbide, or other hardened material, is permanently mounted in a tool holder formed from steel or other more plentiful material. The tool bit is usually positioned in a slot in the end of the holder and is securely held therein by brazing. During the brazing of the tool bit in position the bit is generally subjected necessarily to an open flame which has a deleterious effect upon the bit, thereby reducing the life of the tool and also changing its cutting properties. The tool bit is frequently no longer uniform in quality so that a uniform cutting action cannot be obtained. One of the principal objects of the present invention is to provide for securing the tool bit in position within the holder without subjecting the bit to the direct action of a heating flame.

Where the tool is located in a slot in the holder it is rigidly supported in one direction by the material forming the holder, but there is no support for the bit in a direction parallel to the slot, with the result that the tool bit may, after use, be loosened in the slot and damaged. A further object of the invention is to provide for supporting the tool bit against movement in all directions within the holder by having material of the holder extending on all sides of the tool bit.

Other and further objects and advantages of the invention will more fully appear from the following detailed description taken in connection with the accompanying drawing in which—

Fig. 1 is a side elevation of a tool bit and holder embodying the invention.

Fig. 2 is an end view of the tool of Fig. 1.

Fig. 3 is a view showing the holder and the tool bit separately before being assembled.

Fig. 4 shows a holder and tool bit in position for heating the holder for securing the bit therein.

Fig. 5 shows the holder and tool bit of Fig. 4 after cooling.

Fig. 6 is an end view of another modified form.

Like reference characters refer to like parts in the different figures.

With reference first to Fig. 1, the tool bit 1, which is circular in cross section, is located in a cylindrical bore 2 in a tool holder 3, so that the tool bit is supported by the material of the holder on all sides thereof, as will be apparent from the showing of Fig. 2. The tool bit itself does not take the lateral thrust resulting from the boring or turning action of the tool, but instead, the lateral thrust is taken up by the material forming the holder. It will be apparent that the tool bit may be of any desired cross section and that the bore 2 may also be of any desired cross section so long as the bit and bore are both of the same approximate shape. A small lateral opening 4 is provided in the tool holder adjacent the base of the bore 2 to provide for the escape of air when the tool bit is inserted within the holder.

One of the best methods for mounting the tool bit within the holder without the necessity for subjecting the bit to a direct heating flame is shown in Fig. 3, where the diameter of the bit 1 is slightly greater than the diameter of the bore 2 on the order of one or two thousandths of an inch. By heating the holder the bore 2 will be temporarily expanded enough to allow the tool bit to be readily inserted in the bore with the air escaping through the opening 4. The holder is allowed to cool after the bit is positioned therein and the tool bit is accordingly held securely in position. The bit is obviously not subjected to any direct heat during the mounting of the bit.

An alternative method for mounting the tool bit in the holder is shown in Figs. 4 and 5. With reference to these figures, it will be apparent that the holder 5 has an axial bore 6 in the end thereof which is slightly larger than the diameter of the tool bit 7 on the order of one or one and one-half thousandths of an inch. Powdered brazing alloy 8 is then placed in the base of the bore 6 and the tool bit is inserted within the holder. If the holder is now placed upright, as in Fig. 4, and heated to a temperature sufficiently high to melt the alloy 8 the molten alloy will be carried up the sides of the bore and around the bit by capillary attraction so that the alloy completely surrounds the bit. If a sufficient amount of alloy is provided, it will completely cover the bit, as shown in Fig. 5. When the holder and bit have subsequently been allowed to cool, the bit will be securely held within the holder by the brazing alloy and the tool, and the end of the holder may then be ground, or otherwise cut to the desired shape for the tool. The molten alloy, if it is used in sufficient quantity to completely cover the bit, as shown in Fig. 5, will protect the bit from any oxydizing action of the atmosphere while the holder and bit are cooling.

In Fig. 6 is shown a modification of the tool of Figs. 3 and 4 in that the tool bit 9 is semi-circular in cross section and the bore 10 in the holder 11 is filled by the semi-circular tool bit and a similarly shaped semi-circular steel insert 12. The combined radii of the steel insert and the tool bit are slightly less than the diameter of the bore, as in Figs. 3 and 4, and the brazing alloy 13, when melted, will be carried by capillary attraction around and between the bit and the insert to provide for a secure mounting of the bit within the bore of the holder. This arrangement allows the use of a smaller amount of the material forming the cutting tool.

From the foregoing it will be apparent that the present invention provides a mounting for a tool bit within a holder which will avoid the subjection of the bit to direct heat and which will also provide for supporting the tool bit, by material forming the holder, on all sides of the bit. The tool bit is thus securely mounted within the holder and supported thereby against movement in any direction.

I claim:

In the formation of a cutting tool which comprises a holder having a tool bit positioned in a recess therein, the steps which involve placing sufficient unmolten brazing alloy in the recess to entirely surround the tool bit positioned therein and to cover completely the outer end of the tool bit when the alloy is melted to a sufficient depth to prevent oxidation of the tool bit, placing a tool bit slightly shorter than the recess in said recess provided by the holder, and heating the holder with the recess open at the top thereof to melt the alloy, causing it to flow entirely around the bit and cover the outer end thereof completely, thereby preventing oxidation of the material forming the bit during the solidifying of the brazing alloy and cooling of the holder.

ALFRED E. HINTERMEYER.